United States Patent
Hwang

(10) Patent No.: US 10,872,438 B2
(45) Date of Patent: Dec. 22, 2020

(54) ARTIFICIAL INTELLIGENCE DEVICE CAPABLE OF BEING CONTROLLED ACCORDING TO USER'S GAZE AND METHOD OF OPERATING THE SAME

(71) Applicant: LG ELECTRONICS INC., Seoul (KR)

(72) Inventor: Taeju Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/543,152

(22) Filed: Aug. 16, 2019

(65) Prior Publication Data

US 2019/0371002 A1 Dec. 5, 2019

(30) Foreign Application Priority Data

Jul. 1, 2019 (KR) .......................... 10-2019-0079038

(51) Int. Cl.
| | |
|---|---|
| G06T 7/73 | (2017.01) |
| G06F 3/13 | (2006.01) |
| G06F 3/01 | (2006.01) |
| G05B 13/02 | (2006.01) |
| G06N 3/04 | (2006.01) |

(52) U.S. Cl.
CPC .............. *G06T 7/75* (2017.01); *G05B 13/027* (2013.01); *G06F 3/013* (2013.01); *G06N 3/04* (2013.01); *G06T 2207/20081* (2013.01); *G06T 2207/20084* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 2018/0217249 A1* | 8/2018 | La Salla | G06K 9/00288 |
| 2019/0311718 A1* | 10/2019 | Huber | G06F 3/0304 |
| 2020/0017026 A1* | 1/2020 | Kumar | G06F 3/012 |

* cited by examiner

*Primary Examiner* — Duane N Taylor, Jr.
(74) *Attorney, Agent, or Firm* — Lee, Hong, Degerman, Kang & Waimey PC

(57) ABSTRACT

An artificial intelligence (AI) device capable of being controlled according to a user's gaze includes a communication unit, a camera configured to capture an image of a user, and a processor configured to acquire user state information from the image of the user, acquire a gaze position of the user based on the acquired user state information, calculate a distance between the acquired gaze position and the camera, receive, from one or more external AI devices, one or more distances between gaze positions of the user respectively acquired by the external AI devices and cameras respectively provided in the external AI devices through the communication unit, and compare the calculated distance with the received one or more distances to select a controlled device.

15 Claims, 8 Drawing Sheets

| FACE DIRECTION | FACE ANGLE | GAZE DIRECTION | GAZE COORDINATES |
|---|---|---|---|
| LEFT/UP | 30 DEGREES | 35 DEGREES | (0, 4, 5) |
| RIGHT/DOWN | 60 DEGREES | 55 DEGREES | (1, 2, 3) |
| UP/RIGHT | 20 DEGREES | 15 DEGREES | (5, 4, 1) |
| ... | ... | ... | ... |

ARTIFICIAL INTELLIGENCE DEVICE CAPABLE OF BEING CONTROLLED ACCORDING TO USER'S GAZE AND METHOD OF OPERATING THE SAME

CROSS-REFERENCE TO RELATED APPLICATIONS

Pursuant to 35 U.S.C. § 119(a), this application claims the benefit of earlier filing date and right of priority to Korean Patent Application No. 10-2019-0079038, filed on Jul. 1, 2019, the contents of which are hereby incorporated by reference herein in its entirety.

BACKGROUND

The present invention relates to an artificial intelligence device capable of being controlled according to user's gaze action and a method of operating the same.

Competition for voice recognition technology which has started in smartphones is expected to become fiercer in the home with diffusion of the Internet of things (IoT).

In particular, an artificial intelligence (AI) device capable of issuing a command using voice and having a talk is noteworthy.

A voice recognition service has a structure for selecting an optimal answer to a user's question using a vast amount of database.

A voice search function refers to a method of converting input voice data into text in a cloud server, analyzing the text and retransmitting a real-time search result to a device.

The cloud server has a computing capability capable of dividing a large number of words into voice data according to gender, age and intonation and storing and processing the voice data in real time.

As more voice data is accumulated, voice recognition will be accurate, thereby achieving human parity.

However, when there is a plurality of AI devices, all the AI devices may be activated according to the same startup command. Therefore, it is difficult to select a device which will operate according to an operation command uttered later.

That is, an unintended AI device may operate according to an operation command uttered by a user.

SUMMARY

An object of the present invention is to clearly specify an AI device to be controlled in consideration of a user's gaze.

Another object of the present invention is to prevent an unintended device from operating according to a command uttered by a user when there is a plurality of AI devices.

An artificial intelligence (AI) device capable of being controlled according to a user's gaze according to an embodiment of the present invention includes a communication unit, a camera configured to capture an image of a user, and a processor configured to acquire user state information from the image of the user, acquire a gaze position of the user based on the acquired user state information, calculate a distance between the acquired gaze position and the camera, receive, from one or more external AI devices, one or more distances between gaze positions of the user respectively acquired by the external AI devices and cameras respectively provided in the external AI devices through the communication unit, and compare the calculated distance with the received one or more distances to select a controlled device.

A method of operating an artificial intelligence (AI) device capable of being controlled according to a user's gaze, according to another embodiment of the present invention may capturing an image of a user, acquiring user state information from the image of the user, acquiring a gaze position of the user based on the acquired user state information, calculating a distance between the acquired gaze position and the camera; receiving, from one or more external AI devices, one or more distances between gaze positions of the user respectively acquired by the external AI devices and cameras respectively provided in the external AI devices, and comparing the calculated distance with the received one or more distances to select a controlled device.

DETAILED DESCRIPTION OF THE EMBODIMENTS

<Artificial Intelligence (AI)>

Figure 1:
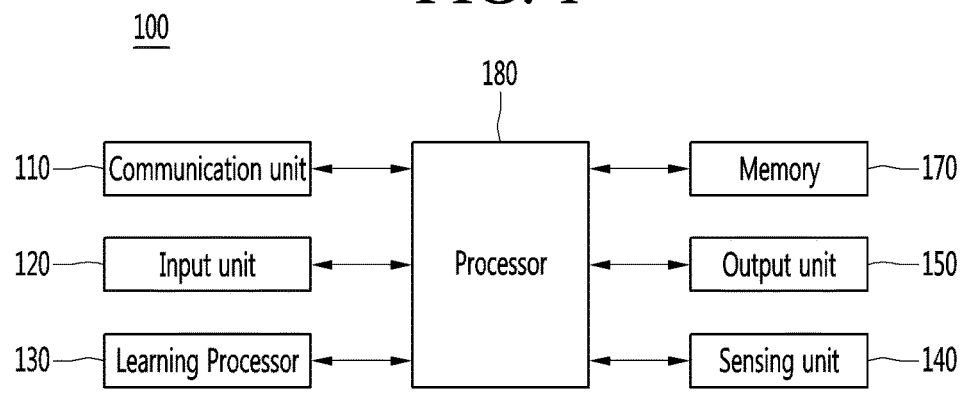
FIG. 1 is a view showing an artificial intelligence (AI) device according to an embodiment of the present invention.

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep running is part of machine running. In the following, machine learning is used to mean deep running.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
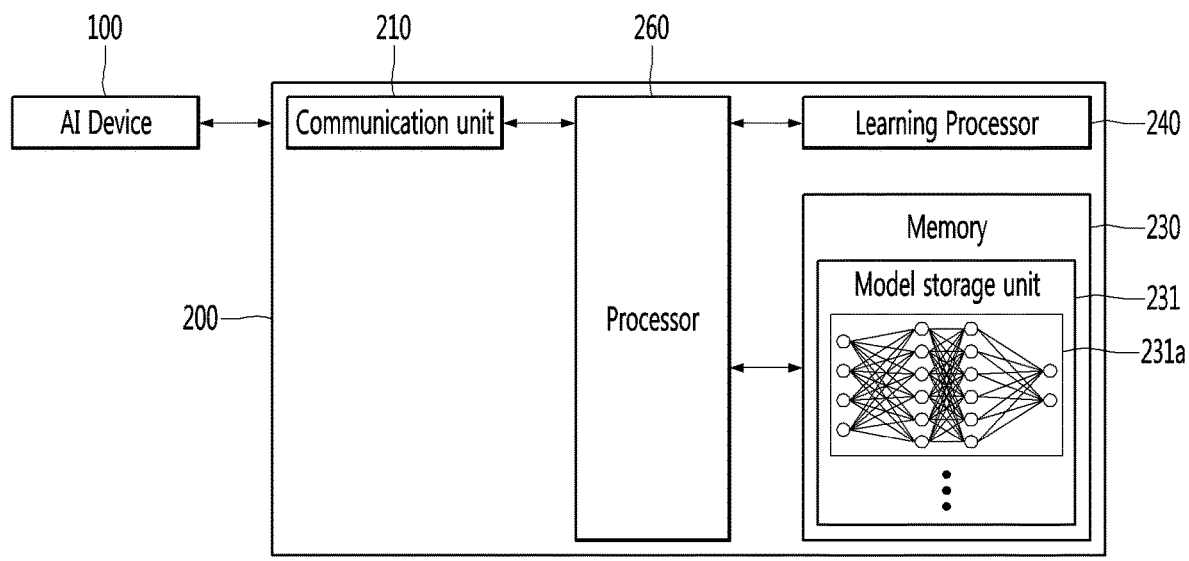
FIG. 2 is a view showing an AI server according to an embodiment of the present invention.

FIG. 2 illustrates an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
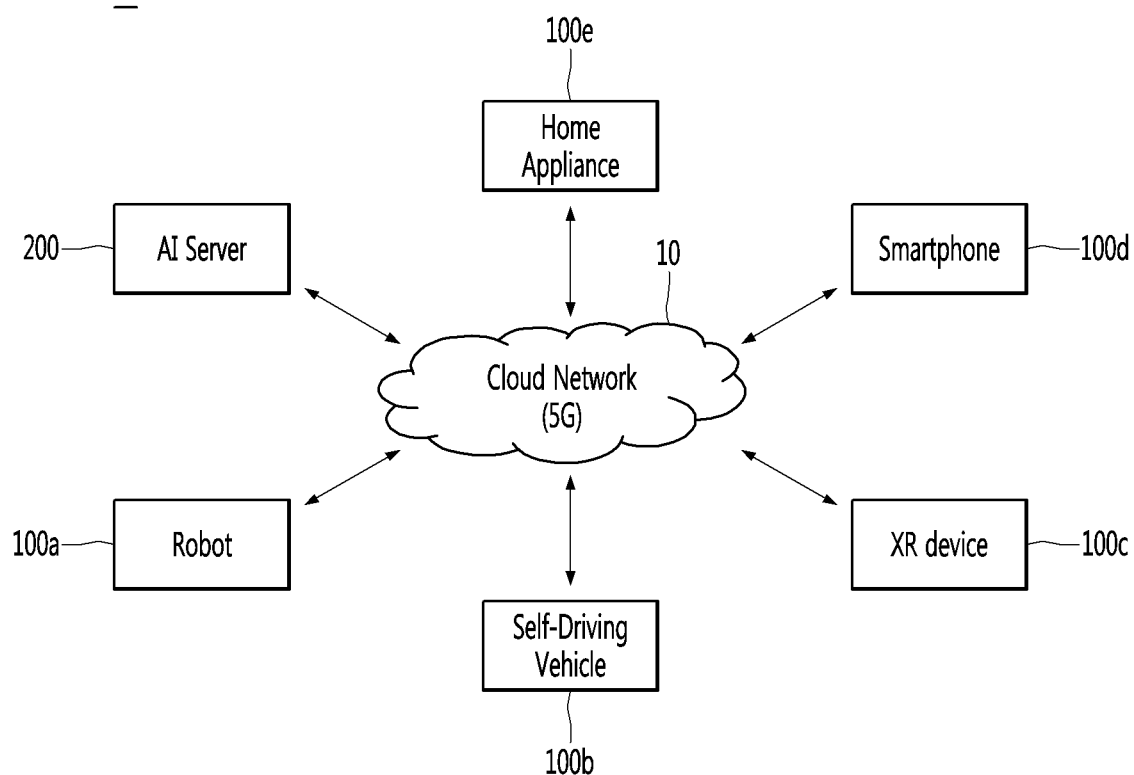
FIG. 3 is a view showing an AI system according to an embodiment of the present invention.

FIG. 3 illustrates an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100*b* travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100*b* may perform the operation or travel by controlling the driving unit based on the control/interaction of the user. At this time, the self-driving vehicle 100*b* may acquire the intention information of the interaction due to the user's operation or speech utterance, and may determine the response based on the acquired intention information, and may perform the operation.

<AI+XR>

The XR device 100*c*, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100*c* may analyzes three-dimensional point cloud data or image data acquired from various sensors or the external devices, generate position data and attribute data for the three-dimensional points, acquire information about the surrounding space or the real object, and render to output the XR object to be output. For example, the XR device 100*c* may output an XR object including the additional information about the recognized object in correspondence to the recognized object.

The XR device 100*c* may perform the above-described operations by using the learning model composed of at least one artificial neural network. For example, the XR device 100*c* may recognize the real object from the three-dimensional point cloud data or the image data by using the learning model, and may provide information corresponding to the recognized real object. The learning model may be directly learned from the XR device 100*c*, or may be learned from the external device such as the AI server 200.

At this time, the XR device 100*c* may perform the operation by generating the result by directly using the learning model, but the sensor information may be transmitted to the external device such as the AI server 200 and the generated result may be received to perform the operation.

<AI+Robot+Self-Driving>

The robot 100*a*, to which the AI technology and the self-driving technology are applied, may be implemented as a guide robot, a carrying robot, a cleaning robot, a wearable robot, an entertainment robot, a pet robot, an unmanned flying robot, or the like.

The robot 100*a*, to which the AI technology and the self-driving technology are applied, may refer to the robot itself having the self-driving function or the robot 100*a* interacting with the self-driving vehicle 100*b*.

The robot 100*a* having the self-driving function may collectively refer to a device that moves for itself along the given movement line without the user's control or moves for itself by determining the movement line by itself.

The robot 100*a* and the self-driving vehicle 100*b* having the self-driving function may use a common sensing method so as to determine at least one of the travel route or the travel plan. For example, the robot 100*a* and the self-driving vehicle 100*b* having the self-driving function may determine at least one of the travel route or the travel plan by using the information sensed through the lidar, the radar, and the camera.

The robot 100*a* that interacts with the self-driving vehicle 100*b* exists separately from the self-driving vehicle 100*b* and may perform operations interworking with the self-driving function of the self-driving vehicle 100*b* or interworking with the user who rides on the self-driving vehicle 100*b*.

At this time, the robot 100*a* interacting with the self-driving vehicle 100*b* may control or assist the self-driving function of the self-driving vehicle 100*b* by acquiring sensor information on behalf of the self-driving vehicle 100*b* and providing the sensor information to the self-driving vehicle 100*b*, or by acquiring sensor information, generating environment information or object information, and providing the information to the self-driving vehicle 100*b*.

Alternatively, the robot 100*a* interacting with the self-driving vehicle 100*b* may monitor the user boarding the self-driving vehicle 100*b*, or may control the function of the self-driving vehicle 100*b* through the interaction with the user. For example, when it is determined that the driver is in a drowsy state, the robot 100*a* may activate the self-driving function of the self-driving vehicle 100*b* or assist the control of the driving unit of the self-driving vehicle 100*b*. The function of the self-driving vehicle 100*b* controlled by the robot 100*a* may include not only the self-driving function but also the function provided by the navigation system or the audio system provided in the self-driving vehicle 100*b*.

Alternatively, the robot 100*a* that interacts with the self-driving vehicle 100*b* may provide information or assist the function to the self-driving vehicle 100*b* outside the self-driving vehicle 100*b*. For example, the robot 100*a* may provide traffic information including signal information and the like, such as a smart signal, to the self-driving vehicle 100*b*, and automatically connect an electric charger to a charging port by interacting with the self-driving vehicle 100*b* like an automatic electric charger of an electric vehicle.

<AI+Robot+XR>

The robot 100*a*, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100*a*, to which the XR technology is applied, may refer to a robot that is subjected to control/interaction in an XR image. In this case, the robot 100*a* may be separated from the XR device 100*c* and interwork with each other.

When the robot 100*a*, which is subjected to control/interaction in the XR image, may acquire the sensor information from the sensors including the camera, the robot 100*a* or the XR device 100*c* may generate the XR image based on the sensor information, and the XR device 100*c* may output the generated XR image. The robot 100*a* may operate based on the control signal input through the XR device 100*c* or the user's interaction.

For example, the user can confirm the XR image corresponding to the time point of the robot 100*a* interworking remotely through the external device such as the XR device 100*c*, adjust the self-driving travel path of the robot 100*a* through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
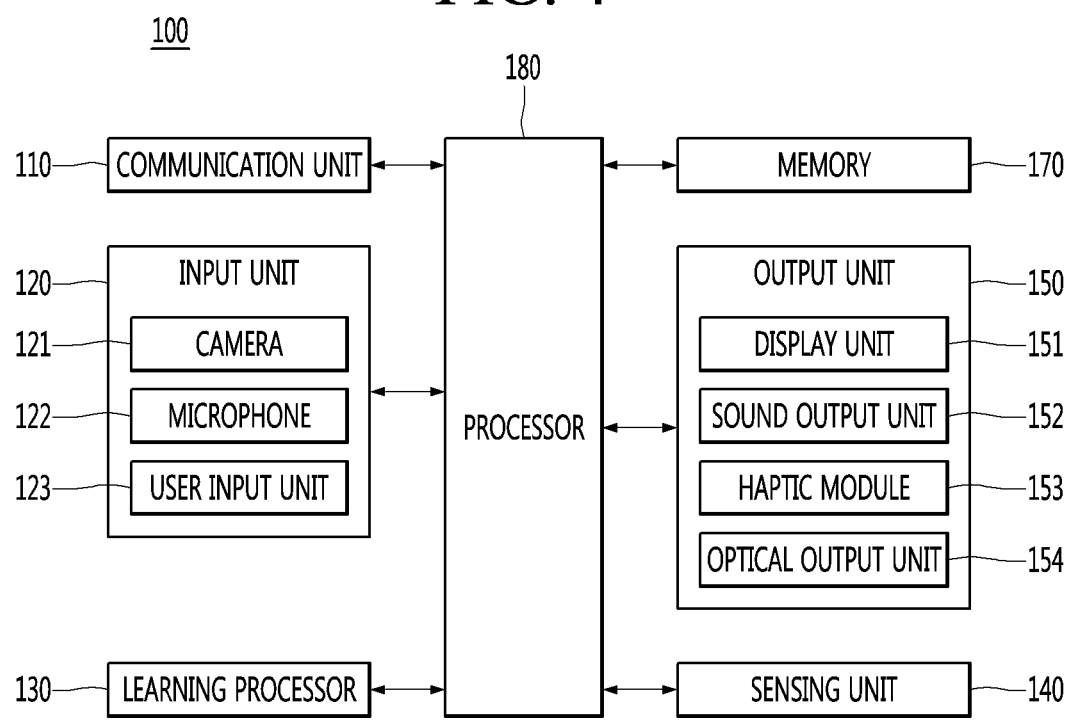
FIG. 4 is a view showing an artificial intelligence (AI) device according to another embodiment of the present invention.

FIG. 4 shows an AI device 100 according to an embodiment of the present invention.

A repeated description of FIG. 1 will be omitted.

Referring to FIG. 4, an input unit 120 may include a camera 121 for receiving a video signal, a microphone 122 for receiving an audio signal and a user input unit 123 for receiving information from a user.

Audio data or image data collected by the input unit 120 may be analyzed and processed as a control command of the user.

The input unit 120 receives video information (or signal), audio information (or signal), data or information received from the user, and the AI device 100 may include one or a plurality of cameras 121 for input of the video information.

The camera 121 processes an image frame such as a still image or a moving image obtained by an image sensor in a video call mode or a shooting mode. The processed image frame may be displayed on a display unit 151 or stored in a memory 170.

The microphone 122 processes external acoustic signals into electrical sound data. The processed sound data may be variously utilized according to the function (or the application program) performed in the AI device 100. Meanwhile, various noise removal algorithms for removing noise generated in a process of receiving the external acoustic signal is applicable to the microphone 122.

The user input unit 123 receives information from the user. When information is received through the user input unit 123, a processor 180 may control operation of the AI device 100 in correspondence with the input information.

The user input unit 123 may include a mechanical input element (or a mechanical key, for example, a button located on a front/rear surface or a side surface of the terminal 100, a dome switch, a jog wheel, a jog switch, and the like) and a touch input element. As one example, the touch input element may be a virtual key, a soft key or a visual key, which is displayed on a touchscreen through software processing, or a touch key located at a portion other than the touchscreen.

An output unit 150 may include at least one of a display unit 151, a sound output unit 152, a haptic module 153, and an optical output unit 154.

The display unit 151 displays (outputs) information processed in the AI device 100. For example, the display unit 151 may display execution screen information of an application program executing at the AI device 100 or user interface (UI) and graphical user interface (GUI) information according to the execution screen information.

The display unit 151 may have an inter-layered structure or an integrated structure with a touch sensor so as to implement a touchscreen. The touchscreen may provide an output interface between the terminal 100 and a user, as well as functioning as the user input unit 123 which provides an input interface between the AI device 100 and the user.

The sound output unit 152 may output audio data received from a communication unit 110 or stored in the memory 170 in a call signal reception mode, a call mode, a record mode, a voice recognition mode, a broadcast reception mode, and the like.

The sound output unit 152 may include at least one of a receiver, a speaker, a buzzer or the like.

The haptic module 153 may generate various tactile effects that can be felt by a user. A representative example of tactile effect generated by the haptic module 153 may be vibration.

The optical output unit 154 may output a signal indicating event generation using light of a light source of the AI device 100. Examples of events generated in the AI device 100 may include a message reception, a call signal reception, a missed call, an alarm, a schedule notice, an email reception, an information reception through an application, and the like.

Figure 5:
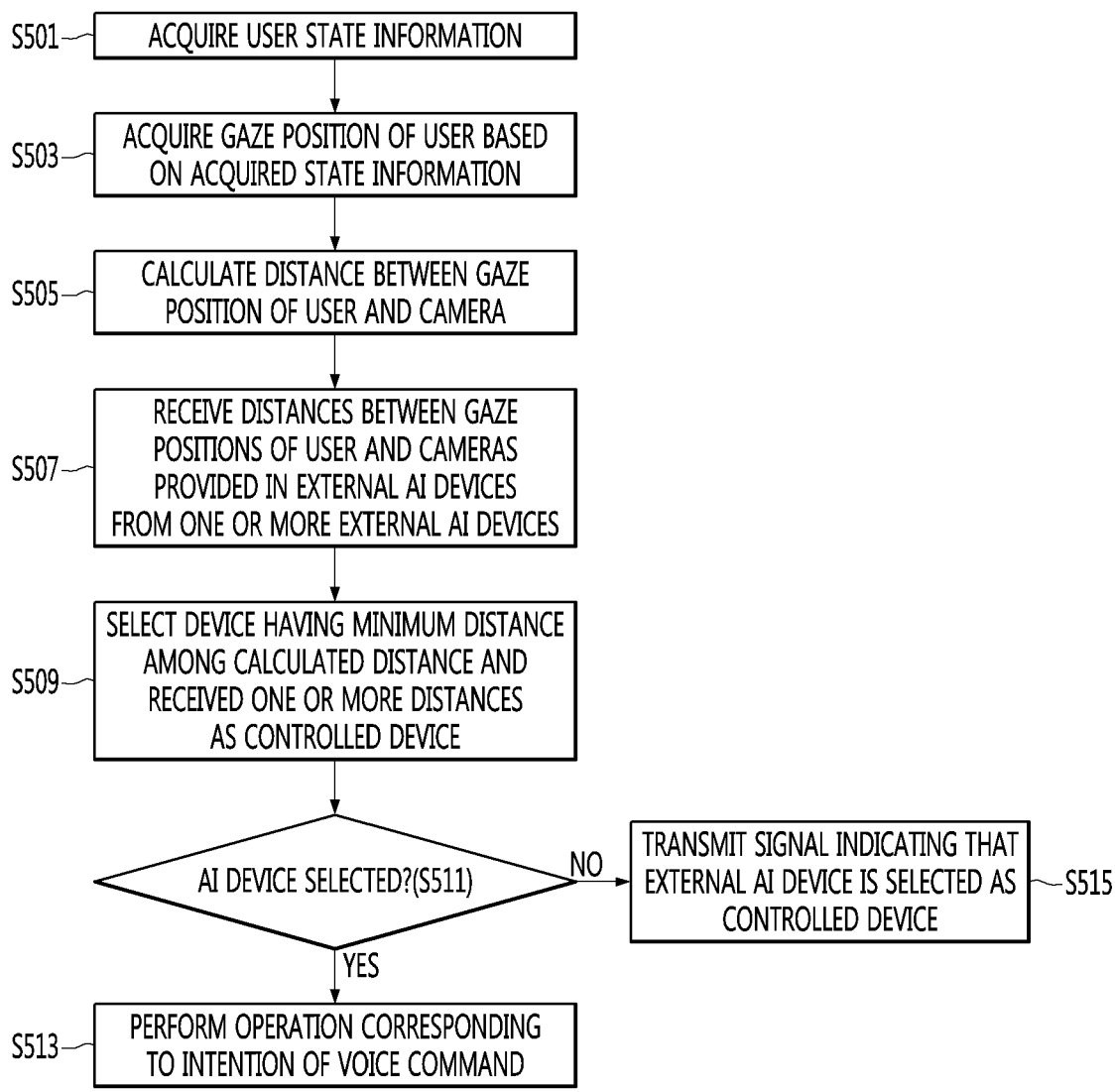
FIG. 5 is a flowchart illustrating a method of operating an AI device according to an embodiment of the present invention.

FIG. 5 is a flowchart illustrating a method of operating an AI device according to an embodiment of the present invention.

In particular, FIG. 5 relates to selection of an AI device corresponding to the gaze position of a user as a controlled device.

In FIG. 5, the operation state of the AI device 100 may include an inactive state and an active state.

The inactive state of the AI device 100 may be an unawakened state incapable of performing operation corresponding to a voice command of a user.

The active state of the AI device 100 may be an awake state capable of performing operation corresponding to a voice command of a user. The AI device 100 may receive the user command and perform operation according to the received command, in the active state.

The active state of the AI device may mean a state in which a voice recognition service is capable of being provided.

The AI device 100 may receive a voice command through the microphone 122 and changes the operation state to the active state when the received voice command is a startup command.

That is, the startup command may be used to wake up the AI device 100 to be controlled by the user.

Hereinafter, assume that a plurality of AI devices is in the active state according to the startup command of the user.

Referring to FIG. 5, the processor 180 of the AI device 100 acquires user state information through the camera 121 (S501).

The user state information may include one or more of the face direction, face angle and gaze direction of the user.

The processor 180 may acquire a 2D image of the user through the camera 121 and convert the acquired 2D image of the user into a 3D image.

The processor 180 may acquire the face direction of the user, the face angle of the user, the gaze direction of the user from the converted 3D image.

The processor 180 may extract a facial image from the 3D image and acquire the face direction and the face angle from the extracted facial image.

The face direction may indicate whether the user's face is directed in an up, down, left or right direction based on the front surface.

The face angle may indicate at which angle the user's face is directed in the up, down, left or right direction based on the front surface.

The memory 170 may store a plurality of face sample images. Each of the plurality of face sample images may correspond to the direction of a specific face and the angle of the specific face.

The processor 180 may compare the facial image extracted from the 3D image with stored face sample images and acquire a face direction and a face angle corresponding to the matching face sample image.

The processor 180 may extract an eye image from the 3D image and grasp the gaze direction of the user from the extracted eye image. The processor 180 may extract an iris or a pupil from the eye image and acquire the direction of the iris or the direction of the pupil as the direction of the gaze.

The processor 180 acquires the gaze position of the user based on the acquired user state information (S503).

The processor 180 may acquire the gaze position of the user using the user state information and a gaze position recognition model.

The gaze position of the user may be gaze coordinates indicating the gaze position of the user. The gaze coordinates may be three-dimensional coordinates.

The gaze position recognition model may be an artificial neural network based model learned using a deep learning algorithm or a machine learning algorithm.

The gaze position recognition model may be learned through supervised learning.

The learning data of the gaze position recognition model may include the face direction, the face angle and gaze direction of the user and the gaze coordinates as labeling data.

The gaze position recognition model may be learned with the aim of accurately inferring the gaze coordinates using the face direction, the face angle and gaze direction of the user as input data.

The gaze position recognition model will be described with reference to the following drawings.

Figure 6:
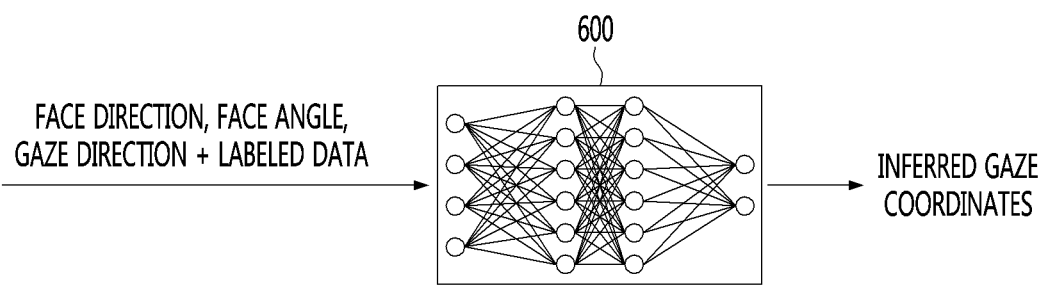
FIG. 6 is a view illustrating a gaze position recognition model according to an embodiment of the present invention.
Figures 7, 8:
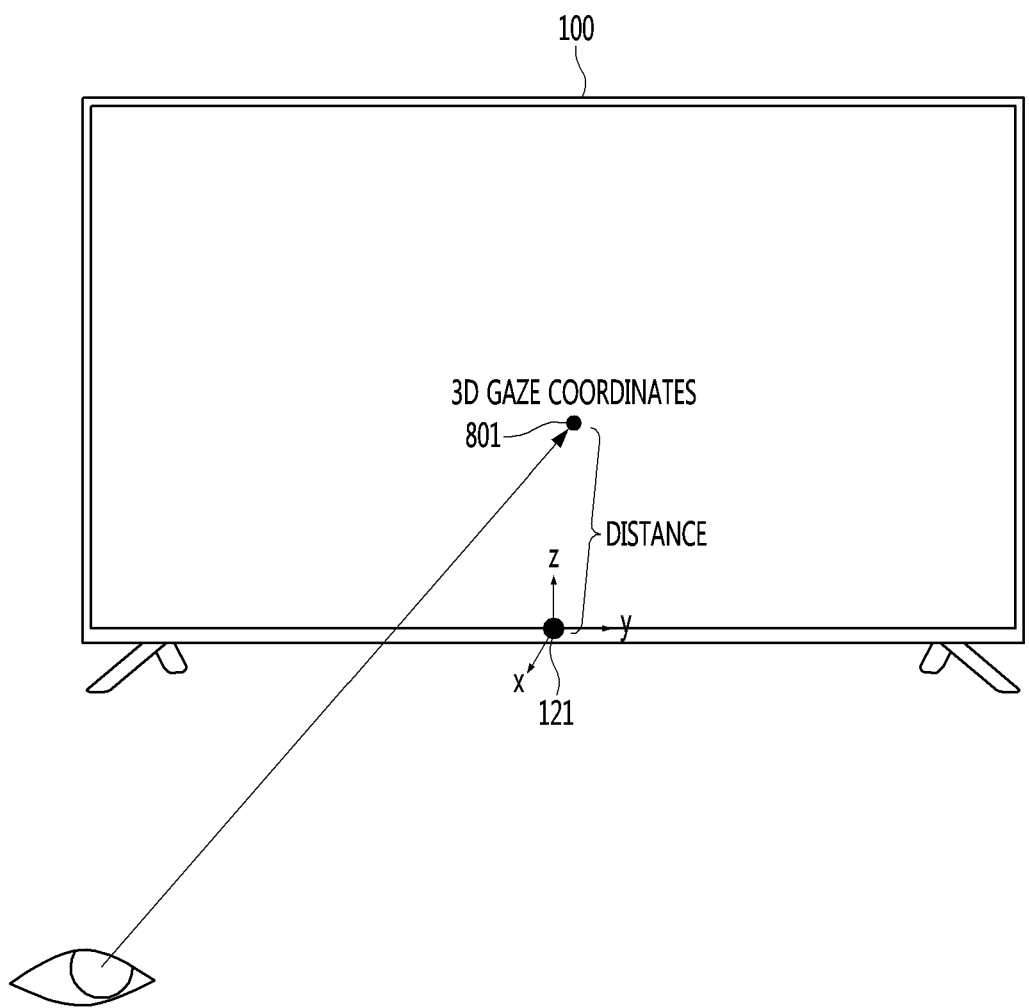
FIG. 7 is a view illustrating learning data of a gaze position recognition model.
FIG. 8 is a view illustrating a process of calculating a distance between gaze coordinates and a camera according to an embodiment of the present invention.

FIG. 6 is a view illustrating a gaze position recognition model according to an embodiment of the present invention, and FIG. 7 is a view illustrating learning data of a gaze position recognition model.

Referring to FIG. 6, the gaze position recognition model 600 is shown.

The gaze position recognition model 600 is an artificial neural network based model and may be a model for inferring gaze coordinates using the face direction, the face angle and gaze direction of the user as input data and using the gaze coordinates, which are correct data, as labeling data.

When input feature vectors are extracted from the user state data for learning and are input to the gaze position recognition model 600, the inferred gaze coordinates may be output as a target feature vector and the gaze position recognition model 600 may be learned to minimize the cost function corresponding to a difference between the output target feature vector and labeled gaze coordinates.

The gaze position recognition model may be learned by the learning processor 240 of the AI server 200. The processor 180 may receive the gaze position recognition model from the AI server 200 through the communication unit 110 and store the gaze position recognition model in the memory 170.

The gaze position recognition model may be learned using obtained state information in a state in which the positions of the user and the AI device 100 are fixed.

As described below, the gaze position recognition model installed in an external AI device may be learned using the acquired user state information in a state in which the positions of the external AI device and the user are fixed.

Meanwhile, FIG. 7 shows an example of learning data used for the gaze position recognition model.

The learning data may include a face direction, a face angle, a gaze direction and labeled gaze coordinates.

FIG. 5 will be described again.

The processor 180 calculates a distance between the acquired gaze position of the user and the camera 121 (S505).

The processor 180 may calculate a distance between the gaze coordinates inferred by the gaze position recognition model 600 and the camera 121 provided in the AI device 100.

The processor 180 may use the position of the camera 121 as the origin and calculate the distance between the origin and the gaze coordinates.

This will be described with reference to FIG. 8.

FIG. 8 is a view illustrating a process of calculating a distance between gaze coordinates and a camera according to an embodiment of the present invention.

In FIG. 8, assume that the user's gaze is directed to the AI device 100.

The processor 180 may calculate the distance between the gaze position 801 obtained by the gaze position recognition model 600 and the camera 121.

The gaze position 801 may be coordinates located in a three-axis (x-, y- and z-axis) space using the position of the camera 121 as the origin.

The processor 180 may calculate the distance between the gaze position and the camera 121 using the origin and the three-dimensional gaze coordinates.

FIG. 5 will be described again.

The processor 180 receives, from one or more external AI devices, the distances between the gaze positions of the user respectively measured by the external AI devices and the cameras respectively provided in the external AI devices (S507).

The processor 180 may receive the distances calculated by the external AI devices from the one or more external AI devices through the communication unit 110.

Each external AI device may include all the components shown in FIG. 4.

Each external AI device may acquire user state information through the camera and acquire the gaze position of the user based on the acquired user state information.

Each external AI device may acquire gaze coordinates using the gaze position recognition model described with reference to FIG. 6.

The gaze position recognition model may be specific to each external AI device. That is, the learning data used to learn the gaze position recognition model in each external AI device may be acquired based on the position of the external AI device.

This is because the positions of the AI device 100 and the external AI devices are different.

The gaze coordinates may be calculated using the position of the camera provided in each external AI device as the origin. That is, the coordinates of the camera are the origin.

Figure 9:
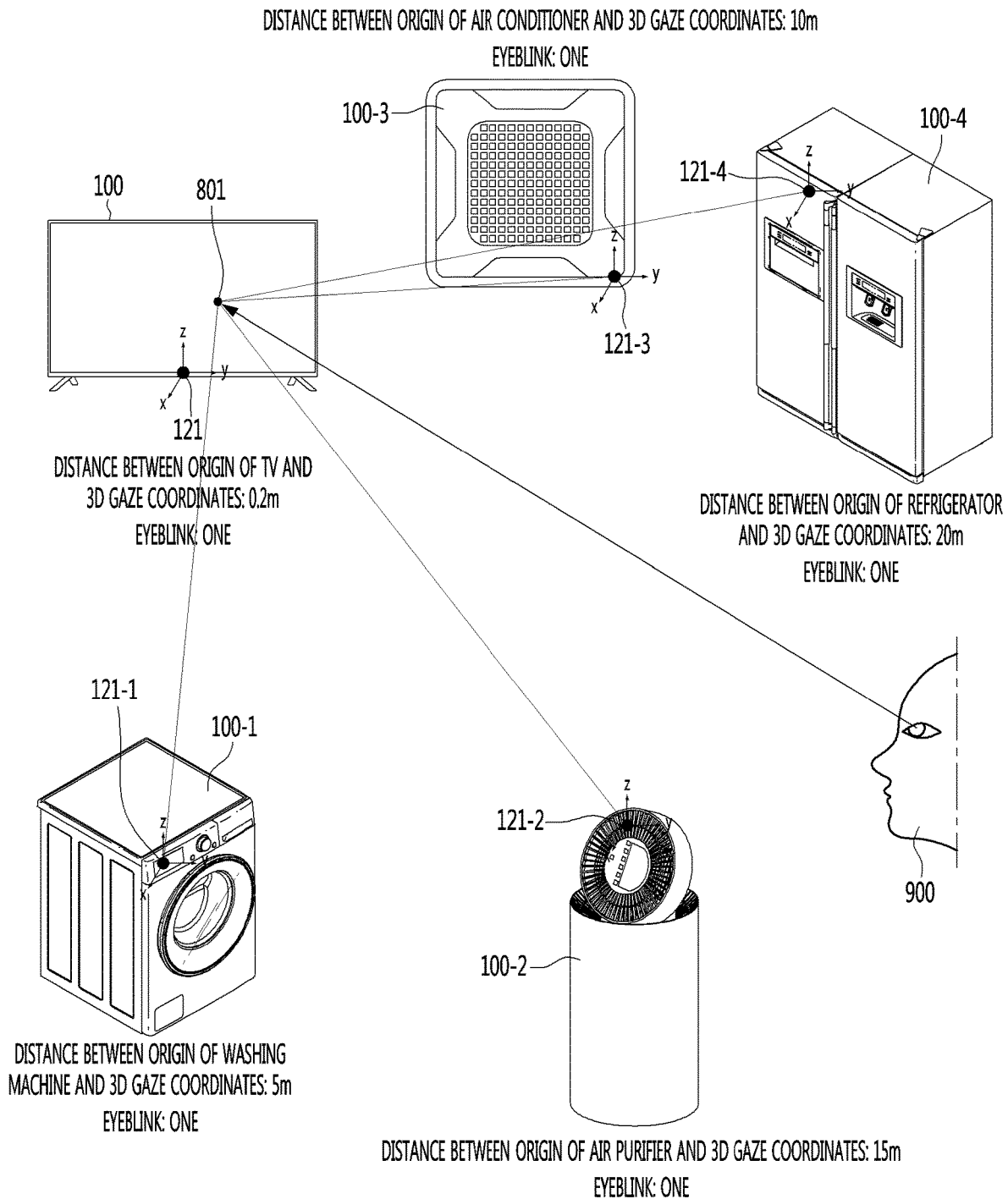
FIG. 9 is a view showing a process of acquiring a gaze position corresponding to the gaze direction of a user at a plurality of AI devices and acquiring a distance between a gaze position and a camera provided in each AI device according to an embodiment of the present invention.

FIG. 9 is a view showing a process of acquiring a gaze position corresponding to the gaze direction of a user at a plurality of AI devices and acquiring a distance between a gaze position and a camera provided in each AI device according to an embodiment of the present invention.

Referring to FIG. 9, the AI device 100 and the plurality of external AI devices 100-1 to 100-4 are provided.

Each AI device may perform wireless communication through the communication unit 110. The communication unit 110 may include a short-range wireless communication module using Wi-Fi or Bluetooth.

First, the distance between the gaze position 801 of the user 900 and the camera 121 calculated by the AI device 100 may be 0.2 m.

The distance between the coordinates of the gaze position 801 of the user 900 and the camera 121-1 calculated by the first external AI device 100-1 may be 5 m. The first external AI device 100-1 may acquire the gaze coordinates corresponding to the gaze position 801 using the gaze position recognition model. The first external AI device 100-1 may calculate the distance between the acquired gaze coordinates and the origin which is the position of the camera 121-1.

In the same manner, the second external AI device 100-2 may acquire 15 m as the distance between the camera 121-2 and the coordinates of the gaze position 801, the third external AI device 100-3 may acquire 10 m as the distance between the camera 121-3 and the coordinates of the gaze position 801, and the fourth external AI device 100-4 may acquire 20 m as the distance between the camera 121-4 and the coordinates of the gaze position 801.

Each of the first to fourth external AI devices 100-1 to 100-4 may transmit the distance acquired thereby to the AI device 100 through short-range wireless communication.

Meanwhile, according to another embodiment, each AI device may calculate the distance between the gaze position of the user and the camera after recognizing eyeblink of the user. The distance is calculated after recognizing eyeblink, in order to reflect that the user's gaze is fixed to an object to be controlled for a certain period of time.

Each AI device may recognize the eyeblink of the user based on the image of the user 900 acquired through the camera.

This will be described with reference to FIGS. 10 and 11.

Figure 10:
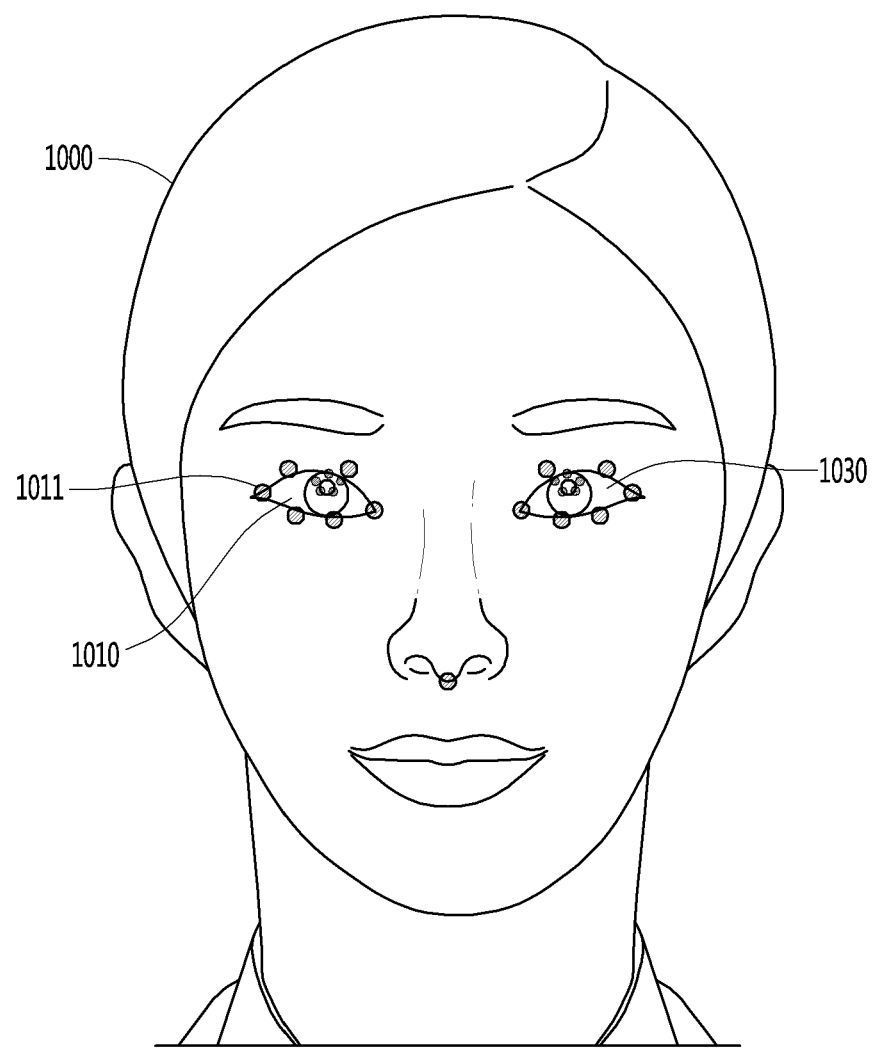
FIGS. 10 and 11 are views illustrating a process of recognizing eyeblink of a user.
Figure 11:
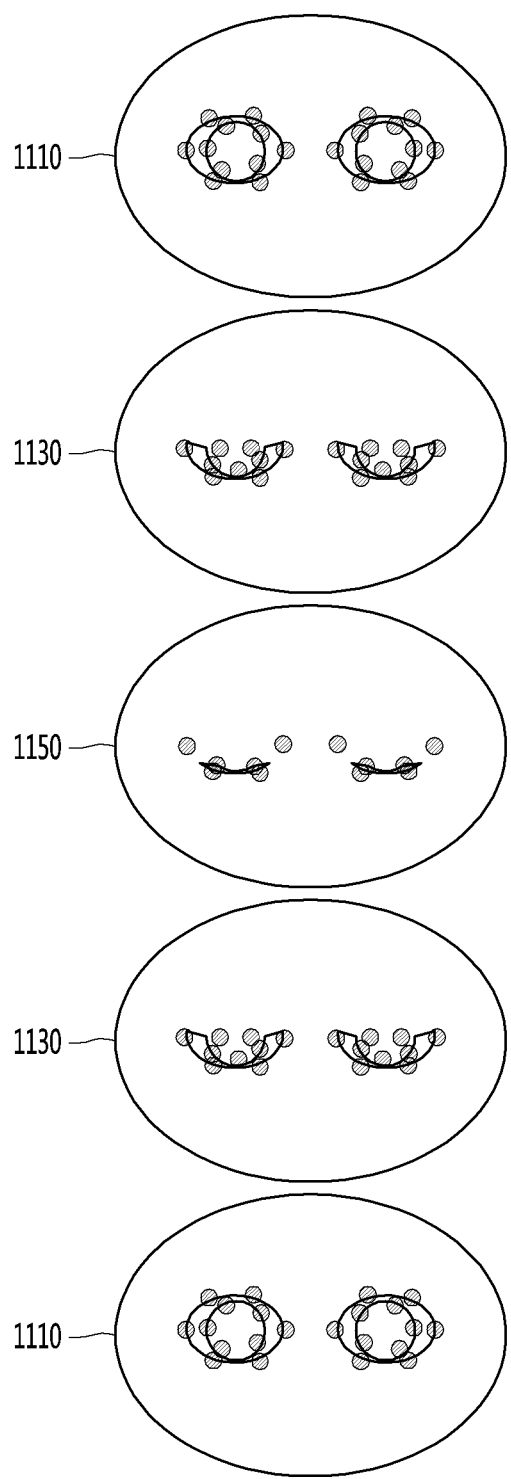

FIGS. 10 and 11 are views illustrating a process of recognizing eyeblink of a user.

First, referring to FIG. 10, a user face image 1000 is shown.

The processor 180 may extract a right eye image 1010 and a left eye image 1030 from the user face image 1000.

The processor 180 may extract the right eye image 1010 and the left eye image 1030 from the user face image 1000 using a known feature point extraction method.

The processor 180 may extract landmarks 1011 indicating the features of the eye from the right eye image 1010 and the left eye image 1030.

The landmarks 1011 may be located on the outline, pupil, iris and eyelid of the eye.

The processor 180 may recognize eyeblink of the user using the landmarks 1011.

This will be described in detail with reference to FIG. 11.

Referring to FIG. 11, states indicating eyeblink are sequentially shown.

Eyeblink includes a process of changing the state in order of a first state 1110 in which the eye is completely opened, a second state 1130 in which the eye is half-closed, and a third state 1150 in which the eye is closed, the second state 1130 and the third state 1150.

The processor 180 may recognize eyeblink based on change in the landmarks included in the right eye image and the left eye image.

Specifically, the number of landmarks is largest in the first state 1110, is reduced in the second state 1130 as compared to the first state 1110, and is further reduced in the third state 1150 as compared to the second state 1130.

Thereafter, the processor 180 may recognize that the user's eyes are opened again based on the number of landmarks acquired in each of the second state 1130 and the first state 1110.

The processor 180 may recognize eyeblink using the landmarks indicating the features of the left eye image and the right eye image.

FIG. 5 will be described again.

The processor 180 compares the distance calculated in step S505 with the received one or more distances and selects a device having a minimum distance as a controlled device (S509).

For example, referring to FIG. 9, the processor 180 may select the device thereof as the controlled device, because a minimum distance is 0.2 m among the distances acquired by the AI devices.

Being selected as the controlled device may mean being selected as a subject responding to the voice command uttered by the user.

The processor 180 may transmit a signal indicating that the device thereof is selected as the controlled object to the external AI devices through the communication unit 110, when the device thereof is selected as the controlled device.

In another example, the processor 180 may transmit, to each external AI device, a message indicating that the device thereof is selected as a controlled device and an operation state needs to be changed to an inactive state. Each external AI device may change the operation state thereof from the active state to the inactive state according to the received message.

The operation states of the devices other than the device selected as the controlled device are changed to the inactive state, such that the devices other than the device selected as the controlled device do not recognize the voice command uttered by the user.

Therefore, it is possible to clearly specify a device to be controlled by a user and to prevent an unintended device from operating.

Since the user can clearly specify the controlled device by simply looking at a device to be controlled, it is possible to significantly improve convenience in selection of a controlled device.

The processor 180 determines whether the device thereof is selected (S511), and performs operation according to the intention of the voice command uttered by the user when the device thereof is selected (S513).

The processor 180 may receive the voice command of the user through the microphone 122 and acquire the intention of the received voice command.

The processor 180 may analyze the intention of the voice command using a natural language processing engine provided therein.

In another example, the processor 180 may transmit the voice command to the AI server 200 and receive the intention of the voice command from the AI server 200. At this time, the AI server 200 may include a natural language processing server.

When an external AI device is selected, the processor 180 transmits, to the corresponding external AI device, a signal indicating that the corresponding external AI device is selected as the controlled device through the communication unit 110 (S515).

At the same time, the processor 180 may transmit, to the other external AI devices, a signal indicating that the above-described external AI device is selected. In addition, the processor 180 may also transmit, to the other external AI devices, a signal for requesting change of the operation state to the inactive state.

Therefore, the other external AI devices may not recognize the voice command uttered by the user.

Since the other external AI devices do not recognize the voice command uttered by the user, it is possible to clearly specify the external AI device to be controlled by the user and to acquire a voice recognition result suiting the intention of the user.

According to the embodiment of the present invention, since the user can clearly specify a controlled device by simply looking at a device to be controlled, it is possible to significantly improve convenience in selection of a controlled device.

In addition, when there is a plurality of AI devices, since a device to be controlled by a user is clearly specified, it is possible to prevent an unintended device from operating.

The present invention mentioned in the foregoing description can also be embodied as computer readable codes on a computer-readable recording medium. Examples of possible computer-readable mediums include HDD (Hard Disk Drive), SSD (Solid State Disk), SDD (Silicon Disk Drive), ROM, RAM, CD-ROM, a magnetic tape, a floppy disk, an optical data storage device, etc. The computer may include the controller 180 of the AI device.

What is claimed is:

1. An artificial intelligence (AI) device comprising:
    a communication circuit;
    a camera; and
    one or more processors configured to:
        acquire user state information from one or more images of a user captured via the camera;
        acquire a gaze position of the user based on the acquired user state information;
        calculate a first distance between the acquired gaze position and the camera;
        receive, from at least one external AI device via the communication circuit, a respective calculated distance between the gaze position of the user and a corresponding camera of each of the at least one external AI device; and
        select a device as a controlled device based on a comparison of the first calculated distance and the respective calculated distances of each of the at least one external AI device.

2. The AI device of claim 1, wherein a device having a minimum distance among the first calculated distance and the respective calculated distances is selected as the controlled device.

3. The AI device of claim 2, wherein the one or more processors are further configured to transmit to the at least one external AI device a signal indicating that the AI device is selected as the controlled device and that an operation state of the at least one external AI device is to be changed to an inactive state based on the AI device having the minimum distance.

4. The AI device of claim 2, wherein the one or more processors are further configured to transmit to one the at least one external AI device a signal indicating that the one external AI device is selected as the controlled device based on the one external AI device having the minimum distance.

5. The AI device of claim 1, wherein the user state information includes a face direction, a face angle, and a gaze direction of the user.

6. The AI device of claim 5, further comprising a memory, wherein:
    the one or more processors are further configured to acquire the gaze position using the user state information as an input to a gaze position recognition model stored in the memory; and
    the gaze position recognition model is an artificial neural network.

7. The AI device of claim 6, wherein:
    training data of the gaze position recognition model includes the user state information and gaze coordinates as labeling data; and
    the gaze position recognition model is trained such that a difference between an actual position of the gaze and gaze coordinates determined by the gaze position recognition model is minimized.

8. The AI device of claim 6, wherein the gaze position is indicated by three-dimensional gaze coordinates, and the one or more processors are further configured to calculate a distance between coordinates corresponding to the camera and the gaze coordinates, wherein the coordinates corresponding to the camera are represented as an origin.

9. The AI device of claim 3, further comprising a microphone, wherein the one or more processors are further configured to acquire an intention of a voice command of a user received via the microphone and cause an operation to be performed based on the acquired intention.

10. The AI device of claim 1, wherein the one or more processors are further configured to calculate the first distance between the acquired gaze position and the camera after recognizing an eyeblink of the user based on the one or more images of the user captured via the camera.

11. A method of operating an artificial intelligence (AI) device, the method comprising:
    capturing one or more images of a user;
    acquiring user state information from the one or more images of the user;
    acquiring a gaze position of the user based on the acquired user state information;

calculating a first distance between the acquired gaze position and the camera;

receiving, from at least one external AI device, a respective calculated distance between the gaze position of the user and a corresponding camera of each of the at least one external AI device; and selecting a device as a controlled device based on a comparison of the first calculated distance and the respective calculated distances of each of the at least one external AI device.

12. The method of claim 11, wherein a device having a minimum distance among the first calculated distance and the respective calculated distances is selected as the controlled device.

13. The method of claim 12, further comprising transmitting to the at least one external AI device a signal indicating that the AI device is selected as the controlled device and that an operation state of the at least one external AI device is to be changed to an inactive state based on the AI device having the minimum distance.

14. The method of claim 12, further comprising transmitting to one of the at least one external AI device a signal indicating that the one external AI device is selected as the controlled device based on the one external AI device having the minimum distance.

15. The method of claim 11, wherein:

the user state information includes a face direction, a face angle, and a gaze direction of the user;

the gaze position is acquired using the user state information and a gaze position recognition model; and the gaze position recognition model is an artificial neural network.

* * * * *